United States Patent
Rieth

(10) Patent No.: US 6,470,731 B1
(45) Date of Patent: Oct. 29, 2002

(54) METHOD AND DEVICE FOR DETERMINING A PARAMETER FOR AN INSTANTANEOUSLY MAXIMAL FRICTIONAL FORCE COEFFICIENT

(75) Inventor: Peter Rieth, Eltville (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 0 days.

(21) Appl. No.: 09/743,949
(22) PCT Filed: Jul. 16, 1999
(86) PCT No.: PCT/EP99/05078
§ 371 (c)(1), (2), (4) Date: Mar. 23, 2001
(87) PCT Pub. No.: WO00/03889
PCT Pub. Date: Jan. 27, 2000

(30) Foreign Application Priority Data

Jul. 17, 1998 (DE) .......................................... 198 32 265
Feb. 1, 1999 (DE) .......................................... 199 03 932

(51) Int. Cl.$^7$ .............................................. G01N 19/00
(52) U.S. Cl. .............................................................. 73/9
(58) Field of Search ................... 73/9; 701/80; 303/150

(56) References Cited

U.S. PATENT DOCUMENTS

| | | | |
|---|---|---|---|
| 3,893,330 A | | 7/1975 | Shute et al. |
| 4,545,240 A | * | 10/1985 | Leiber ............................. 73/9 |
| 6,163,747 A | * | 12/2000 | Matsuno ...................... 701/80 |
| 6,276,189 B1 | * | 8/2001 | Hurson ............................ 73/9 |

FOREIGN PATENT DOCUMENTS

| | | |
|---|---|---|
| DE | 35 34 022 | 3/1987 |
| DE | 37 35 473 | 5/1989 |
| DE | 42 27 805 | 3/1993 |
| DE | 43 17 050 | 11/1994 |
| DE | 44 35 448 | 4/1995 |
| EP | 0 363 570 | 4/1990 |
| EP | 0 412 791 | 2/1991 |
| EP | 0 444 772 | 9/1991 |
| EP | 0 568 204 | 11/1993 |

OTHER PUBLICATIONS

Search Report of the German Patent Office for Application No. 199 03 932.1.

* cited by examiner

Primary Examiner—Robert Raevis
(74) Attorney, Agent, or Firm—Rader, Fishman & Grauer PLLC

(57) ABSTRACT

The present invention relates to a method and a device for determining a characteristic quantity for an instantaneously maximum coefficient of friction between the tires of a vehicle and a roadway, which is calculated from the ratio between the frictional force and the wheel contact force, especially for defining a following time of the vehicle in relation to another vehicle which is directly in front thereof in the direction of travel, for collision avoidance purposes. In this arrangement, the characteristic quantity of the coefficient of friction is assigned to one of at least two classes and is then presented to a driver of the vehicle and/or sent to the collision avoidance system of the vehicle, by logically linking data output values of sensor means provided in the vehicle, on the one hand. On the other hand, there is provision of an evaluating device which is connected to an outside temperature sensor connected preferably to the engine control of the vehicle, to an air humidity sensor which is preferably connected to an air conditioning system of the vehicle, and/or to a wiper system, especially said's actuating button, stepped switch, and/or rain sensor, in said's inlet range, and to an indicator device, such as a display of a navigation system of the vehicle, and/or a collision avoidance system of the vehicle in its outlet range.

11 Claims, 4 Drawing Sheets

METHOD AND DEVICE FOR DETERMINING A PARAMETER FOR AN INSTANTANEOUSLY MAXIMAL FRICTIONAL FORCE COEFFICIENT

TECHNICAL FIELD

The present invention generally relates to vehicle stability control and more particularly relates to a method and a device for determining a characteristic quantity for an instantaneously maximum coefficient of friction between the tires of a vehicle and a roadway.

BACKGROUND OF THE INVENTION

It is known in the art to invariably adjust the safety distance between two vehicles driving one behind the other in driving control (ICC—Intelligent Cruise Control) operations, i.e., generally to a distance in meters which corresponds to half the indication given on the speedometer in kilometers per hour so that, for example, at 100 km/h the safety distance amounts to 50 m. A safety distance of 50 m is identical to a constant following time $t_s$=1.8 sec. ,irrespective of speed, which is referred to as standard following time hereinbelow.

When the time value drops below the value of the standard following time of more than 50%, that means, $t_s \leq 0.9$ sec., this is presently fined. When the standard following time is exceeded to a considerable extent so that $t_s \geq 3$ sec., this causes problems with filtering in. For this reason, it has already been disclosed to render the following time manually adjustable by the driver of a vehicle so that $0.9$ sec.$\leq t_s <3$ sec. However, this suggestion must be looked at critically because in the event of the driver and/or the weather changing, an incorrectly adjusted value may cause too short stopping distances in critical situations, with the imminent risk of running from behind into the vehicle in front.

Further, it is known in the art that the instantaneously maximum coefficient of friction which is given in approximation by the coefficient of the longitudinal force between the tires of a vehicle and a roadway is appropriate to calculate a safety distance and a following time, respectively.

FIG. 1 shows a characteristic curve of the coefficient of friction/slip ($\mu$-S-variation) for a conventional tire on a conventional roadway during straight travel at 80 km/h and an outside temperature of 20° C., on the one hand, with a height of water of 0.3 mm on the roadway, see curve I, and, on the other hand, with a height of water of 3 mm on the roadway, see curve II. The slip, i.e., the ratio of the difference between a synchronous speed (wheel translational speed) and an asynchronous speed (wheel circumferential speed) with respect to the synchronous speed is indicated in percent both for the drive side and the brake side. As can be taken from a comparison of curves I and II, the coefficient of friction declines by 50% in the event of heavy rain, which should be linked to doubling the following time for safety reasons. Besides, it can be seen in FIG. 1 that depending on the weather conditions, a maximum coefficient of friction, such as $\mu_I$ or $\mu_{II}$, respectively, prevails and must be demanded in emergency situations, and that with 100% slip the coefficient of friction approaches a standard value $\mu_G$ in the event of slightly wet conditions which is a significant parameter in road planning and results from a rating with a single vehicle with PLARC tires traveling in a longitudinal direction on a wet but clean roadway. Finally, it should still be pointed out that for safety reasons a coefficient of friction $\mu$=0.3 is demanded in conventional travel control systems.

Up to date, there are two different approaches in determining the instantaneously maximum coefficient of friction. Thus, optical scanning of a roadway surface beneath a vehicle and in front of a vehicle is performed for the subsequent analysis of the corresponding refraction and reflection behavior, on the one hand. On the other hand, it has been disclosed to install sensors for measuring the shearing force respectively the shearing deformation in the tread bar of a tire. These types of sensing the instantaneously maximum coefficient of friction are costly in terms of manufacture and installation.

EP 0 412 791 A2 describes a method of observing and determining conditions between a vehicle and the roadway surface wherein signals of several sensors for the roadway surface, the vehicle, and outside conditions are analyzed and compared, and a value of the coefficient of friction is determined therefrom.

An object of the present invention is to provide a characteristic quantity for the instantaneously maximum coefficient of friction in a simple and inexpensive manner.

This object is achieved by a method of determining a characteristic quantity for an instantaneously maximum coefficient of friction between the tires of a vehicle and a roadway which is calculated from the ratio between the frictional force and the wheel contact force to define a following time of the vehicle, which is equivalent to a safety distance, in relation to another vehicle which is directly in front thereof in the direction of travel, for collision avoidance purposes, wherein by logically linking data output values of sensor means provided in the vehicle, the characteristic quantity of the coefficient of friction is assigned to one of at least two classes and is then presented to a driver of the vehicle and/or sent to the collision avoidance system of the vehicle.

In a preferred aspect of the present invention, the characteristic quantity of the coefficient of friction is assigned to a first class in the event of wet road conditions and otherwise to a second class, preferably, in response to the speed of the vehicle.

In this arrangement, the speed-responsive characteristic quantity of the coefficient of friction of each of the two classes is determined by way of the frequency distribution function of the coefficients of friction over a large quantity of roadways, such as over all German roads, measured at a 100% slip value, especially for a single vehicle with standard tires traveling in a longitudinal direction on a wet but clean roadway, preferably over the 95% sum frequency curve of said frequency distribution function.

A preferred aspect of the present invention includes that the characteristic quantity of the coefficient of friction, by way of an indistinct logic, is assigned to one of three classes and, thus, to one of three characteristic quantities which are preferably irrespective of speed.

It may be provided that a characteristic quantity of the frictional force is assigned to one of the three classes and, thus, to one of three characteristic quantities in dependence on parameters of the tires of the vehicle, the roadway, and/or the contact medium between the tire and the roadway, wherein at least one estimation of the parameters of the contact medium is performed and, preferably, the wheel contact force is calculated in approximation for the classification.

Besides, it is proposed according to the present invention that the outside temperature, the relative air humidity, and/or the wiper adjustment, such as on/off and/or frequency, is/are sensed and used logically as the parameters of the contact medium, especially with the assumption of an average roadway and average tires, to determine the characteristic quantity of the frictional force.

It may also be provided according to the present invention that the data output value of a rain sensor is taken into consideration as a parameter of the contact medium when determining the characteristic quantity of the frictional force.

Further, the present invention discloses that low frictional forces or coefficients of friction, respectively, are represented by a first characteristic quantity, medium frictional forces or coefficients of friction are represented by a second characteristic quantity, and high frictional forces or coefficients of friction are represented by a third characteristic quantity, and preferably a first following time of e.g. 2.5 seconds is assigned to the first characteristic quantity, a second following time of e.g. 1.8 seconds is assigned to the second characteristic quantity, and a third following time of e.g. 1.3 seconds is assigned to the third characteristic quantity, the said assignments being made irrespective of speed.

Also, it is disclosed in the present invention that the type of tire, tread design, tire print, rubber compound, and/or the condition of wear is/are taken into consideration as parameters of the tires of the vehicle in the classification for the instantaneously maximum coefficient of friction.

It may be provided that the type of tires can be input by the driver or read in automatically, preferably, by way of a coding.

One embodiment of the present invention is characterized in that the condition of wear of each tire of the vehicle is detected by way of a wear model, preferably, in consideration of a speed histogram, as related to the wheel rotational speeds, in conjunction with a transverse acceleration histogram, as detected by transverse acceleration sensors, and in conjunction with a coefficient-of-friction histogram.

It is also possible according to the present invention to determine the condition of wear in consideration of a histogram of the wheel pressures.

Also, according to the present invention, the material of construction, the structure of the surface and/or the surface temperature is/are taken into consideration as parameters of the road surface in the classification for the instantaneously maximum coefficient of friction.

Further, the height of a water film, ice and/or solid snow on a roadway is/are taken into consideration as parameters of the contact medium according to the present invention.

Still further, the parameters of the roadway and/or of the contact medium are input into an evaluating device by way of a transponder system at the border of a roadway according to the present invention.

To achieve the object of the present invention, an improvement of the generic device is disclosed that is characterized by an evaluating device which is connected to an outside temperature sensor preferably linked to the engine control of the vehicle, to an air humidity sensor which is preferably connected to an air conditioning system of the vehicle, and/or a wiper system, especially said's actuating button, stepped switch and/or rain sensor, in said's inlet range, and to an indicator device, such as a display of a navigation system of the vehicle, and/or a collision avoidance system of the vehicle in its outlet range.

It may be provided that the evaluating device is connected to a road surface temperature sensor, such as an infrared camera.

Besides, the present invention discloses that the evaluating device receives parameters of a roadway and/or a contact medium between the roadway and the tires of the vehicle by means of telemetric data input from transponders at the border of the roadway.

One embodiment of the present invention is characterized in that speed data to determine a speed histogram, transverse acceleration data to determine a transverse acceleration histogram, and/or coefficients of friction to determine a wheel pressure histogram can be stored in the evaluating device.

In addition, the present invention discloses that the evaluating device is connected to an electric-hydraulic brake system to obtain wheel pressures, and the wheel pressures can be stored in the evaluating device for determining a wheel pressure histogram.

The present invention also proposes a connection between the evaluating device and a control panel for the manual input of parameters.

Finally, it is still disclosed in the present invention that the evaluating device is connected to a device for reading in a type of tires, such as a scanning sensor, preferably comprised on a spring strut, for detecting a coding pulse, preferably by means of a magnetic coding.

Thus, the present invention is based on the surprising finding that sensor data which are already provided in a vehicle are logically combined with each other so that an estimation for the instantaneously maximum coefficient of friction is obtained, from which e.g. a following time is calculated and relayed to a driver or is sent to a collision avoidance of a cruise control system for effectively enhancing the safety of driving.

An improvement of the present invention, which is convincing especially in its simplicity, founds on the principle 'wet road - take off foot from the accelerator pedal', that means, there is a classification in one of two speed-responsive coefficient-of-friction classes, the only distinction made being between wet conditions and none-wet conditions, and reference being made to the frequency distribution function of $\mu_G$ over all German roads, especially the 95% sum frequency.

The preferred embodiment according to the present invention is based on an indistinct logic, the so-called fuzzy logic, according to which a characteristic quantity is assigned to the instantaneously maximum coefficient of friction, and namely in such a manner that there is a classification into one of three classes, to which a characteristic quantity is respectively assigned. The respective characteristic quantity for the instantaneously maximum coefficient of friction may then be presented on a display to a driver for a recommendation of adjustment or can be sent to a travel control system for the automatic adaption of the following distance.

It is preferably proposed to make an at least rough estimation of the influence of the contact medium between the vehicle and the roadway for the determination of the characteristic quantity of the instantaneously maximum coefficient of friction according to the present invention.

DETAILED DESCRIPTION OF THE PREFERRED EMBODIMENTS

Figure 1:
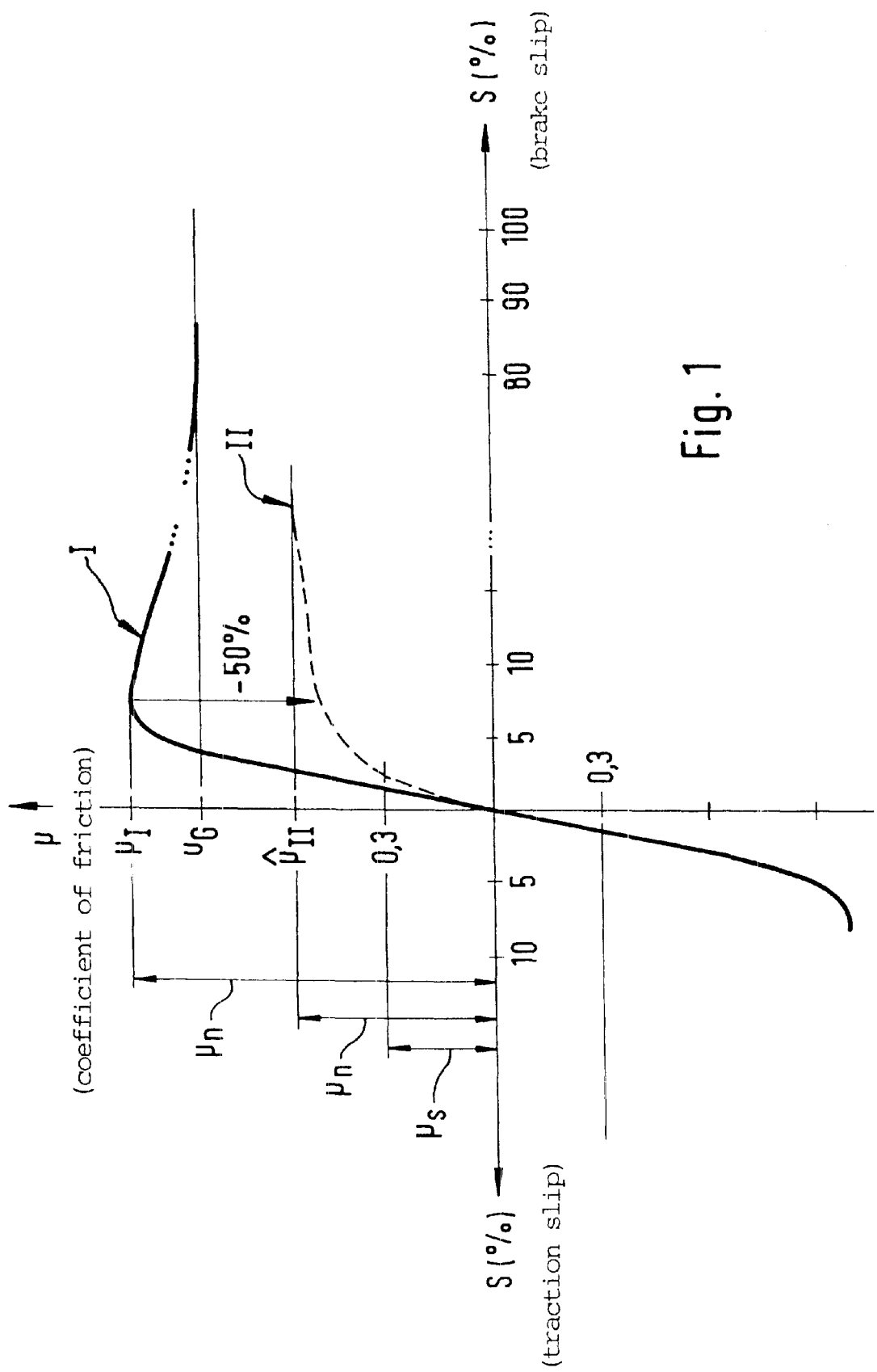
FIG. 1 shows characteristic curves of the instantaneously maximum coefficient of friction in relation to the slip for a conventional tire on a conventional road during straight travel at 80 km/h and an outside temperature of 20° C., with a height of water of 0.3 mm and 3 mm.
Figure 2A:
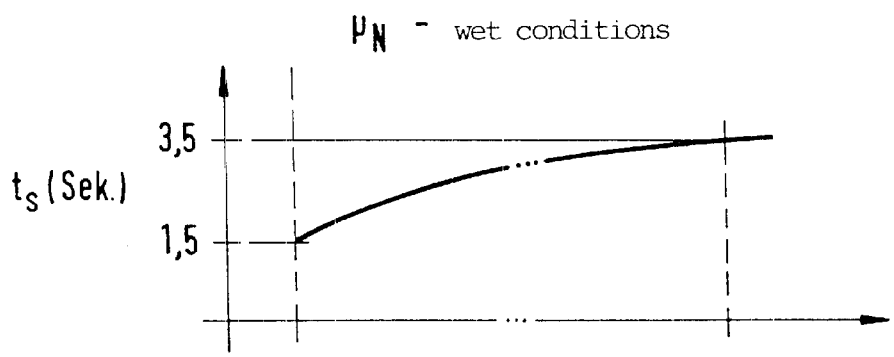
FIGS. 2a, 2b respectively show the course of the following time as a function of the driving speed, with wet conditions in FIG. 2a, and with none-wet conditions in FIG. 2b, according to an embodiment of the present invention.
Figure 2B:
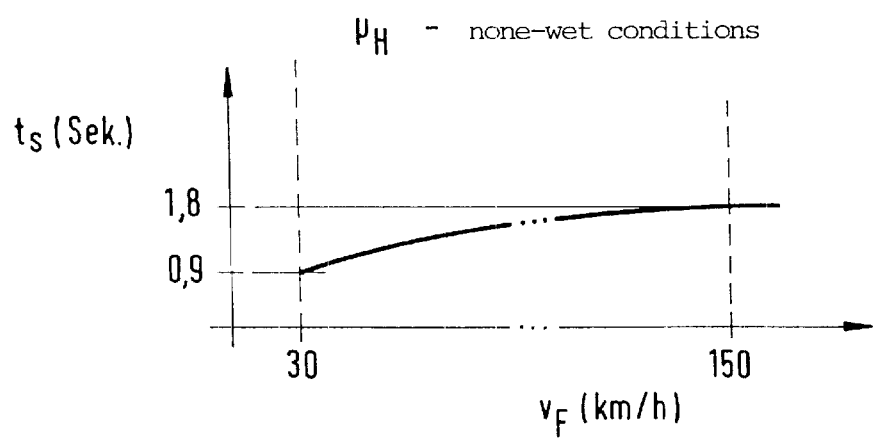

According to a first embodiment of the present invention, a distinction is only made between two classes of coefficients of friction, i.e., $\mu_N$ in the case of wet conditions and $\mu_H$ in the case of none-wet conditions such as measured by a rain sensor of a wiper actuation control, for example. Further, the 95% sum frequency curve of the frequency distribution function of the coefficients of friction $\mu_G$ with 100% slip in the normal case of rating, that is with a single vehicle with PIARC tires traveling in a longitudinal direction, over all German roads, is taken into account to obtain the following times $t_s$ illustrated in FIGS. 2a and 2b. Accordingly, the following time varies in the event of wet conditions from 1.5 seconds to 3.5 seconds and in the event of none-wet conditions from 0.9 seconds to 1.8 seconds. That means, the following time is generally within a range which is defined by the minimum limit value $t_s$=0.9 sec. permitted by law and by the top value $t_s \approx 3$ seconds limited by filtering-in difficulties, and rises constantly with the increase of driving speed in the range from 30 to 150 km/h.

Figure 3:
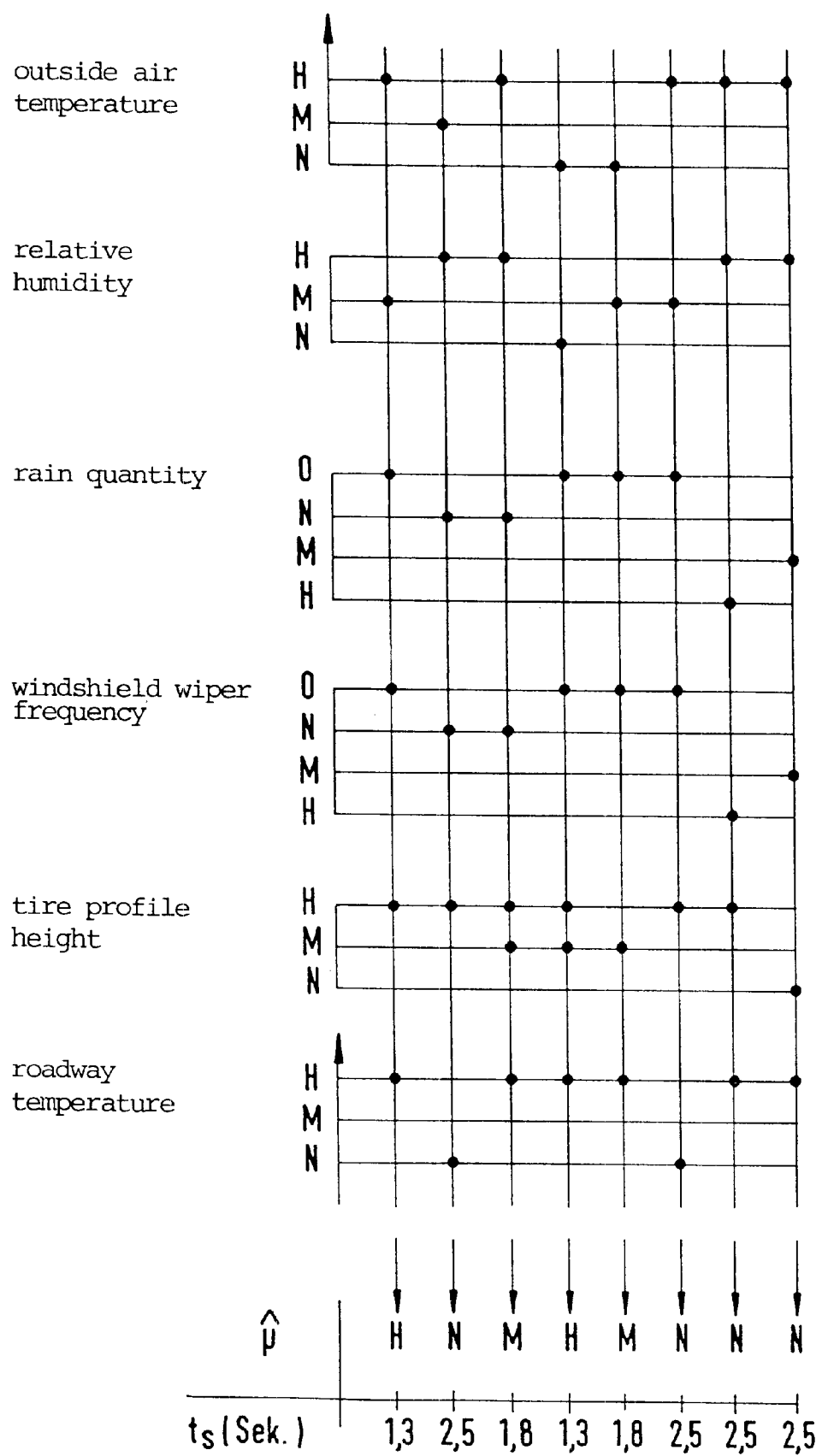
FIG. 3 shows a condition linking diagram to illustrate a possible assignment of measured values to an instantaneously maximum coefficient of friction or, respectively, a following time based on a fuzzy logic according to another embodiment of the present invention.

FIG. 3 shows a linking of data, which are normally available in a vehicle, intended for the assignment of the instantaneously maximum coefficient of friction to one of three classes according to a fuzzy logic in conformity with a second embodiment of the present invention. The following data are linked with each other:

1. Parameters of the Tire

Figure 4:
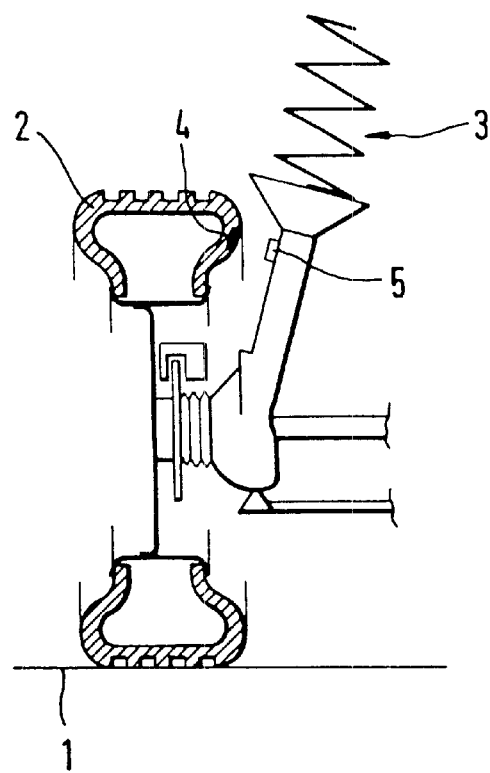
FIG. 4 is a partial cross-sectional view for a demonstration of sensing a type of tire.

The tire profile, the shape of tire, tire compound, type of tire, size of tire, etc., as can be taken in particular from the type of tire applied, is used as tire parameters. The type of tire can either be indicated to an evaluating device manually by the driver, or can be read out automatically. Thus, as is shown in FIG. 4, the type of a tire 2 on a roadway 1 can be determined by way of a magnetic coding 4 on the tire 2 by the use of a scanning sensor 5 installed on the spring strut in the area of brake 3.

2. Parameters of the Roadway

As a parameter of the roadway the road surface temperature is read in into the evaluating device, for example, by way of a telemetric data input from transponders planned at the border of roadways, or by way of sensor means on the vehicle, or simply by way of a constant value.

3. Parameters of the Contact Medium

The parameters of the contact medium between a vehicle and a roadway have the greatest influence on the assignment according to this invention to a characteristic quantity for the actually existing, instantaneously maximum coefficient of friction $\mu$. It is advisable in this context to take into account the outside air temperature, preferably measured by an outside temperature sensor of the engine control, the relative humidity, preferably measured by an air humidity sensor of the air conditioning system, the quantity of rain, preferably measured by a rain sensor of the wiper actuation control, and the wiper frequency.

Assigned to each of the parameters is at least one of three values, i.e., H='high', M='medium', or N='low' and, if necessary, 0, as in the case of a non-existing quantity of rain, or when the wiper is switched off, see FIG. 3. An assignment of the coefficient of friction and, thus, of the following time can be effected with respect to one of three characteristic quantities based on the above-described parameters, and knowing the wheel tread force in approximation, as calculated from the vehicle weight, center of gravity of the vehicle, axle load distribution corresponding to the prevailing vehicle deceleration/vehicle acceleration and vehicle speed. According to the embodiment shown in FIG. 3, it is disclosed in the present invention that $t_s$ $(\mu_H)$=1.3 sec, $t_s$ $(\mu_M)$=1.8 sec, $t_s$ $(\mu_N)$=2.5 sec.

Figure 5:
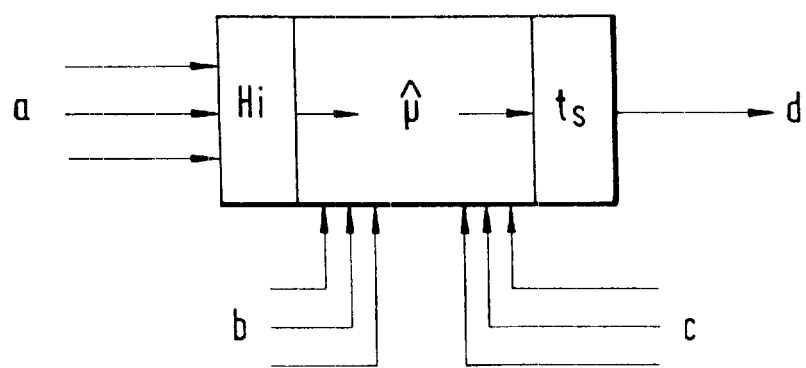
FIG. 5 is a block diagram of an evaluating device of the present invention.

The logic linking operation according to the present invention can be performed in an evaluating device, as shown in FIG. 5. Input quantities a, b and c can be sent to the evaluating device, and the characteristic quantities for the respective following time $t_s$ assigned according to the present invention are output as output quantities d, for example, to a display or a travel control system. According to the present invention, especially the parameters of the tires, of the roadway, and of the contact medium are appropriate as input quantities, as mentioned hereinabove. It should be noted in this respect that in particular the condition of wear of the tires can be determined by way of a wear model which is obtained by way of a speed histogram in connection with a transverse acceleration histogram and an established coefficient-of-friction histogram, as indicated in FIG. 5 by the calculation of the various histograms Hi.

Concludingly, it should be mentioned that the transponder system at the border of roads, which is in the planning stage, will render it possible in the future to have the parameters of the roadway and the contact medium directly included as input in an evaluating device. This provision will considerably improve an estimation of the coefficient of friction and, hence, of the following time, and may possibly lead to a differentiated classification.

The features of the present invention as disclosed in the preceding description, in the drawings, and in the claims can be important, both individually and in any combination desired, for the realization of this invention in its various embodiments.

What is claimed is:

1. Method of determining a characteristic quantity for an instantaneously maximum coefficient of friction between the tires of a vehicle and a roadway, comprising the steps of:
   i) obtaining data output values from at least one sensor,
   ii) calculating using said data output values a characteristic quantity of the coefficient of friction by way of a 95% sum frequency curve of a frequency distribution function of a plurality of coefficients of friction measured at a 100% slip value of said vehicle traveling in a longitudinal direction,
   iii) assigning said coefficient of friction to one of a first class in the event of wet road conditions and a second class in the event of non-wet road conditions, and
   iv) presenting the result of step iii), to the vehicle driver or a collision avoidance system of the vehicle,
      whereby a following time of said vehicle in relation to another vehicle that is directly in front thereof varies in the first class from 1.5 seconds to 3.5 seconds and in the second class from 0.9 seconds to 1.8 seconds.

2. Method of determining a characteristic quantity for an instantaneously maximum coefficient of friction between the tires of a vehicle and a roadway, comprising the steps of:
   i) obtaining data output values from at least one sensor,
   ii) calculating using said data output values a characteristic quantity of the coefficient of friction by way of a 95% sum frequency curve of a frequency distribution function of a plurality of coefficients of friction measured at a 100% slip value of said vehicle traveling in a longitudinal direction,
   iii) assigning said coefficient of friction to one of three classes and, thus, to one of three characteristic quantities in dependence on one of parameters of a tire of the vehicle, parameters of the roadway, and parameters of a contact medium between the tire and the roadway.

3. Method as claimed in claim 2, wherein the parameters of the contact medium between the tire and the roadway comprise one of an outside temperature, a relative air humidity, and a quantity of rain.

4. Method as claimed in claim 2, wherein the quantity of rain is measured by a rain sensor and actuation of a windshield wiper.

5. Method as claimed in claim 2, wherein the first characteristic quantity represents a low coefficient of friction, the second characteristic quantity represents a medium coefficient of friction, and the third characteristic quantity represents a high coefficient of friction, and wherein a first following time is assigned to the first characteristic quantity, a second following time is assigned to the second characteristic quantity, and a third following time is assigned to the third characteristic quantity, and wherein the first, second and third following times are assigned irrespective of vehicle speed.

6. Method as claimed in claim 5, wherein the first following time is 2.5 seconds, the second following time is 1.8 seconds, and the third following time is 1.3 seconds.

7. Method as claimed in 5, wherein the parameters of the tire of the vehicle comprise one of a type of tire, a tread design, a tire print, a rubber compound, and a condition of wear of the tire.

8. Method as claimed in claim 7, wherein the type of tire is input by the driver or read in automatically by way of a magnetic coding on the tire.

9. Method as claimed in claim 7, wherein the condition of wear of the tire is determined by way of a wear model, the wear model being determined by way of a speed histogram, a transverse acceleration histogram, and a coefficient of friction histogram.

10. Method as claimed in claim 2, wherein the parameters of the contact medium comprise at least one of the height of a water film, ice, and solid snow on the roadway.

11. Method as claimed in claim 2, wherein at least one of the parameters of the roadway and the parameters of the contact medium are input into an evaluating device by of a transponder system at a border of the roadway.

* * * * *